(12) United States Patent
Kurabayashi

(10) Patent No.: US 8,645,975 B2
(45) Date of Patent: Feb. 4, 2014

(54) ADDING FUNCTION TO DEVICE DRIVER

(75) Inventor: Kazuhiro Kurabayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 957 days.

(21) Appl. No.: 12/168,966

(22) Filed: Jul. 8, 2008

(65) Prior Publication Data
US 2009/0025015 A1   Jan. 22, 2009

(30) Foreign Application Priority Data

Jul. 17, 2007   (JP) .................................. 2007-185341

(51) Int. Cl.
  *G06F 9/44*   (2006.01)
  *G06F 9/445*   (2006.01)

(52) U.S. Cl.
  USPC ........................... 719/321; 717/168; 717/174

(58) Field of Classification Search
  USPC ................... 717/168, 174; 719/321
  See application file for complete search history.

(56) References Cited

U.S. PATENT DOCUMENTS

| | | | | |
|---|---|---|---|---|
| 6,892,381 B2* | 5/2005 | Kim et al. | ...................... | 717/171 |
| 7,853,946 B2* | 12/2010 | Minagawa | .................... | 717/178 |
| 2005/0200873 A1 | 9/2005 | Yamakawa et al. | | |
| 2005/0270572 A1* | 12/2005 | Kassan | ........................ | 358/1.15 |
| 2006/0279778 A1* | 12/2006 | Choi et al. | .................... | 358/1.15 |
| 2007/0124513 A1* | 5/2007 | Kikuchi | ............................ | 710/8 |
| 2007/0245345 A1* | 10/2007 | Yamada | ........................ | 717/174 |
| 2008/0098094 A1* | 4/2008 | Finkelstein et al. | .......... | 709/220 |

FOREIGN PATENT DOCUMENTS

| | | |
|---|---|---|
| JP | 2002-175258 | 6/2002 |
| JP | 2005-050060 | 2/2005 |
| JP | 2005-050061 | 2/2005 |
| JP | 2005-267541 | 9/2005 |
| JP | 2006-171865 | 6/2006 |

OTHER PUBLICATIONS

Japanese Office Action dated Nov. 22, 2011.

* cited by examiner

*Primary Examiner* — Charles E Anya
(74) *Attorney, Agent, or Firm* — IPUSA, PLLC

(57) ABSTRACT

An information processing apparatus includes a detecting unit configured to detect an additional function data file including a description of an added function that is provided in addition to an already-installed device driver, a storing unit configured to store the detected additional function data file in an information storage area recognized as a logical device by an operating system, and a driver control unit configured to incorporate contents of the additional function data file into the already-installed device driver in response to the additional function data file stored in the information storage area.

8 Claims, 8 Drawing Sheets

ADDING FUNCTION TO DEVICE DRIVER

BACKGROUND OF THE INVENTION

1. Field of the Invention

The disclosures herein generally relate to information processing apparatuses, information processing programs, and recording media, and particularly relate to an information processing apparatus such as a server that efficiently adds a new model to, and updates a function of, device drivers for devices such as printers in a proper manner. The disclosures also relate to an information processing program installed in such information processing apparatus and a recording medium having such a program recorded therein.

2. Description of the Related Art

In today's office environment, client apparatuses such as personal computers and word processors as well as network devices such as printers that require drivers are connected to a network. It has become common practice for client apparatus users to use different network devices according to their needs. In order to utilize a network device from a client apparatus, it is necessary for the client apparatus to have a driver installed therein for this network device.

As a method of reducing the work load associated with the installation of drivers, conventionally, printer drivers having a core module and model-dependent modules may be used. When the switching of ports is performed, or a new printer is added, a file including a description of the model data may be newly installed without installing an additional driver. The computer then performs two-way communication with a printer connected thereto to acquire model information about the printer, and loads a model-dependent module corresponding to the acquired model information. The computer then creates a module that functions as a driver for this printer model, thereby reducing the work load associated with the installation. Such technology is disclosed in Japanese Patent Application Publication No. 2002-175258.

Systems for utilizing network devices from a client apparatus include a client/server system that utilizes a server as an intervening apparatus. In the case of a client/server system, the provision of a large number of client apparatuses under the server control imposes an excessive work load on the network administrator when installing drivers to all the client apparatuses. Also, an increase in the number of client apparatuses means an increase of the work load.

For the purpose of reducing the work load associated with the installation of drivers, some operating systems provide a standard function that is used for such purpose. In the case of Windows (registered trademark), Point&Print is provided for the purpose of printer sharing, and serves to automatically distribute printer drivers installed in a printer server to client apparatuses (see, for example, Japanese Patent Application Publication No. 2005-50060 and Japanese Patent Application Publication No. 2005-50061).

The technology disclosed in Japanese Patent Application Publication No. 2002-175258 previously described may be used with Point&Print to make it possible to install only a file including a description of model data of a newly installed model without installing a new printer driver. Such a configuration may reduce the work load associated with the installation of a driver.

When a file including a description of model data is newly installed by use of this disclosed technology, however, the added function data file is not included in an originally installed driver package. Because this function data file is not recognized by the operating system, the file is not subjected to the standard management system supported by the operating system. There is thus a risk of being unable to use some of the functions provided by the operating system. In the case of Point&Print of Windows, only the data relevant to printers managed by the operating system are transmitted to client apparatuses. Accordingly, when Point&Print is executed after a data file of a new model added to the network is installed in the server, the data file of the added model is not transmitted to client apparatuses. The client apparatuses thus cannot use the data file of the added model. In other words, the function of Point&Print does not suffice for the purpose of delivering printer driver functions. There is thus a need to perform a manual action to deliver the data file of the added model to the client apparatuses. Such inconvenience needs to be eliminated. It is conceivable to include a data file of an added model in a driver package to transmit the data file to client apparatuses. Modification to a driver package, however, resets an identification system performed by the operation system. Depending on the employed security system, the driver package may not be usable any more. Modifying the driver package is thus not a proper option.

There is thus a need for an information processing apparatus, an information processing program, and a recording medium that can efficiently add a model to, and update a function of, device drivers in a proper manner.

SUMMARY OF THE INVENTION

It is a general object of at least one embodiment of the present invention to provide an information processing apparatus that substantially eliminates one or more problems caused by the limitations and disadvantages of the related art.

According to one aspect, an information processing apparatus includes a detecting unit configured to detect an additional function data file including a description of an added function that is provided in addition to an already-installed device driver, a storing unit configured to store the detected additional function data file in an information storage area recognized as a logical device by an operating system, and a driver control unit configured to incorporate contents of the additional function data file into the already-installed device driver in response to the additional function data file stored in the information storage area.

According to another aspect, a machine-readable recording medium having a program embodied therein for causing a computer to add a function to an already-installed device driver is provided, wherein the program includes a detecting program-code unit configured to detect an additional function data file including a description of an added function that is provided in addition to an already-installed device driver, a storing program-code unit configured to store the detected additional function data file in an information storage area recognized as a logical device by an operating system, and a driver control program-code unit configured to incorporate contents of the additional function data file into the already-installed device driver in response to the additional function data file stored in the information storage area.

According to another aspect, a method of adding a function to an already-installed device driver in a computer includes detecting an additional function data file including a description of an added function that is provided in addition to an already-installed device driver, storing the detected additional function data file in an information storage area recognized as a logical device by an operating system, and incorporating contents of the additional function data file into the already-installed device driver in response to the additional function data file stored in the information storage area.

According to at least one embodiment of the present invention, upon detecting an additional function data file including a description of an added function provided in addition to an already-installed device driver, the detected additional function data file is stored in an information storage area recognized as a logical device by the operating system. Then, the contents of the additional function data file are incorporated into the already-installed device driver in response to the additional function data file stored in the information storage area. Accordingly, it is possible to effectively and properly add a function for an additional model or function update to the device driver without modifying the contents of the driver package while utilizing all the benefit of the functions of the operating system.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, preferred embodiments of the present invention will be described with reference to the accompanying drawings. The following preferred embodiments include various limitations that may be preferred from the technical point of view. The scope of the present invention, however, is not limited to these embodiments unless there is an explicit indication in the following description that indicates contrary.

Figure 1:
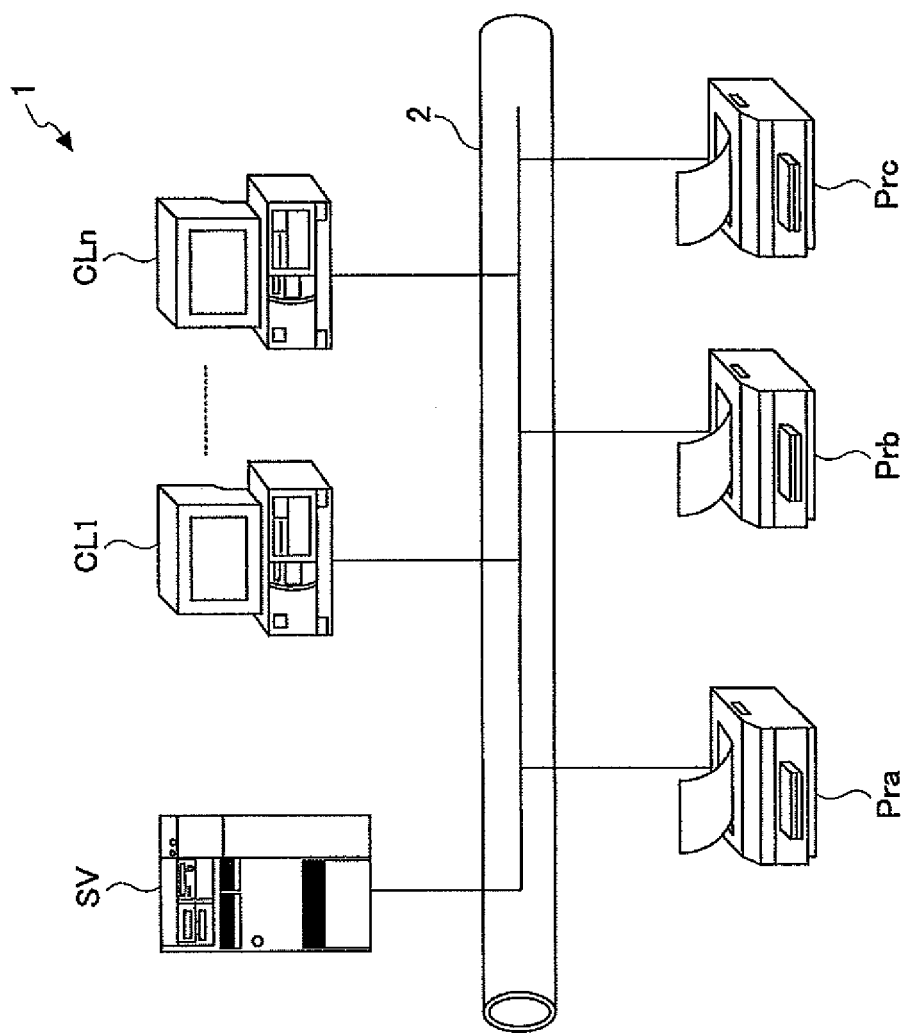
FIG. 1 is a drawing showing the configuration of a system to which an embodiment of the present invention is applied.

FIG. 1 through FIG. 7 are drawings showing an embodiment of an information processing apparatus, an information processing program, and a recording medium. FIG. 1 is a drawing showing the configuration of a network system to which the embodiment of an information processing apparatus, an information processing program, and a recording medium is applied.

In FIG. 1, a network system 1 includes a network 2 such as an Ethernet (registered trademark), and further includes a server SV functioning as an information processing apparatus, a plurality of client terminals CL1 through CLn serving as external apparatuses, and printers Pra and Prb serving as devices, all of which are connected to the network 2. FIG. 1 illustrates the state in which a printer Prc is newly connected in addition to the already connected printers Pra and Prb.

The server SV controls and manages the printers Pra through Prc serving as network devices on the network 2. The server SV receives print jobs from the client terminals CL1 through CLn, and sends the received print jobs to the printers Pra through Pro for printing by the printers Pra through Prc.

In this embodiment, the printers Pra through Prc are all different models. For example, the printer Pra is model A, the printer Prb being model B, and the printer Prc being model C. The printers Pra through Prc perform the print jobs sent from the client terminals CL1 through CLn via the server SV according to print methods corresponding to their respective model types, thereby printing images responsive to print data on print sheets.

The client terminals CL1 through CLn may be computers having normal hardware and software configurations. The installed operating system may be Windows (registered trademark), for example. In the client terminals CL1 through CLn, a print request may be issued with respect to a document that is created by use of an application installed on the operating system. In response to the request, a printer driver corresponding to a selected one of the printers Pra through Prc, which has been installed in the client terminals CL1 through CLn through the Point&Print function of the operating system, creates print data according to print settings. The client terminals CL1 through CLn transmit the print job to the server SV. The server SV then sends the print job to the selected one of the printers Pra through Prc for printing by the selected one of the printers Pra through Prc.

The server SV may be a computer having normal hardware and software configurations. Further, an information processing program recorded in a recording medium such as a CD (Compact Disc), a CD-RW (Compact Disc Rewritable), a DVD (Digital Versatile Disk), a flexible disc, or the like is loaded and installed to the server SV to make the server SV function as a driver management server as will be described later.

Figure 2:
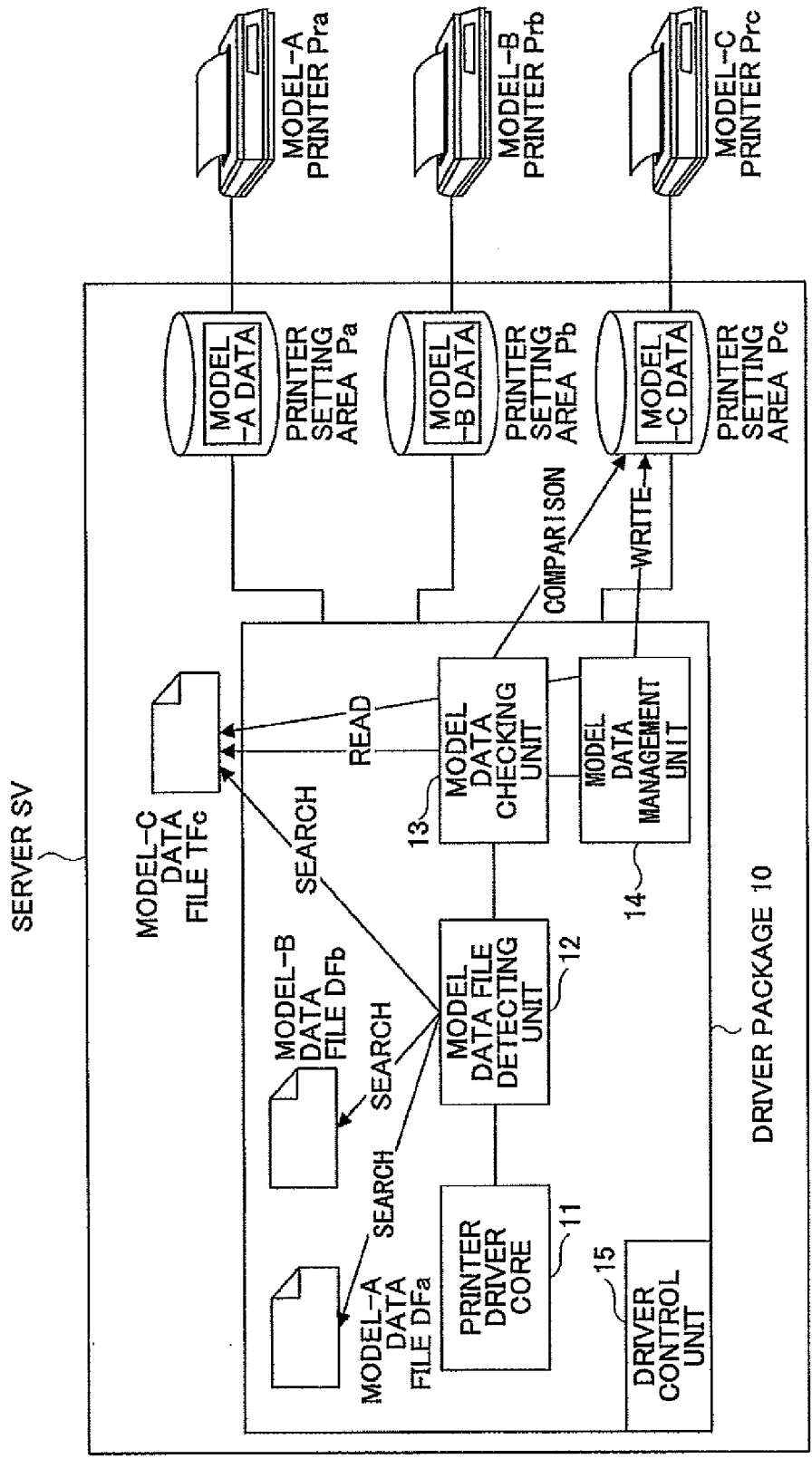
FIG. 2 is a block diagram showing main functional blocks of a server shown in FIG. 1.

Having this information processing program embedded therein, the server SV includes a model data file detecting unit 12, a model data checking unit 13, and a model data management unit 14 in a driver package 10 installed therein as shown in FIG. 2. With such arrangement, the server SV performs a driver management process as will be described later. The driver package 10 includes a printer driver core 11. The printer driver core 11 performs processes such as displaying a user interface UI of a printer driver, generating data to be rendered, etc.

In FIG. 2, the driver package 10 includes function data files DFa and DFb corresponding to the printer Pra of model A and the printer Prb of model B, respectively, that are already installed. The printer driver core 11 performs processes such as outputting data of the function data files DFa and DFb to the user interface, creating data to be rendered in response to settings made through the user interface, etc.

The operating system installed in the server SV has a function to create a printer icon upon the installment of a printer driver. The printer icon serves as a logical printer for the server SV. The printer icon contains various data relating to the printer of the printer driver such as the printer Pra or Prb. One of such data is a printer setting area (PrinterDriverData) that is managed by the operating system. In the example shown in FIG. 2, printer setting areas Pa and Pb are created. In this manner, a printer setting area that is prepared by the operating system such as Windows contains a function data file that is prepared on a printer-specific basis for each printer managed by the operating system. This function data file contains a description of printer driver functions and model data. Each printer setting area is linked to the driver package 10 for the device drivers that are already installed.

For example, a printer setting area may contain the following information.

```
<model name = "model A", version = "1.0.0.0">
    <color support = "yes"/>
</model>
```

Recording of such information serves to register settings indicating that the model type of the printer corresponding to the printer driver is "model A", that the version is "1.0.0.0", and that the color printing function is supported.

As another example, a printer setting area may contain the following information.

```
<model name = "model A", version = "1.1.0.0">
    <color support = "yes"/>
    <Stapler support = "yes"/>
</model>
```

Recording of such information serves to register settings indicating that the model type of the printer corresponding to the printer driver is "model A", that the version is "1.1.0.0", and that the color printing function and stapler function are supported.

The model data file detecting unit 12 searches for function data files inside and outside the driver package 10 provided for the device drivers that are already installed. The model data file detecting unit 12 further searches for additional function data files including a description of an added model or an added function, which is information about a function added to the driver package 10. In FIG. 1 and FIG. 2, for example, a search by the model data file detecting unit 12 covers the function data files DFa and DFb inside the driver package 10 and an additional function data file outside the driver package 10. As the result of the search, the model data file detecting unit 12 finds an additional function data file TFc corresponding to the printer Prc of model C that is added to the pool of printer drivers.

The model data checking unit 13 acquires the additional function data file detected by the model data file detecting unit 12. The model data checking unit 13 compares this additional function data file with printer management information contained in each printer setting area to determine which model matches the additional function data file. In the example shown in FIG. 2, the model data checking unit 13 acquires the additional function data file TFc detected by the model data file detecting unit 12. The model data checking unit 13 compares the additional function data file TFc with printer management information contained in each printer setting area Pa and Pb to determine that the additional function data file TFc relates to new model C.

Upon finding by the model data checking unit 13 that information contained in the additional function data file detected by the model data file detecting unit 12 is information about a new model or new function, the model data management unit 14 stores or updates the additional function data file in a corresponding printer setting area. In the example shown in FIG. 2, upon finding by the model data checking unit 13 that information contained in the additional function data file TFc detected by the model data file detecting unit 12 is information about a new model or new function, the model data management unit 14 stores or updates the additional function data file TFc in a corresponding printer setting area Pc.

In the server SV, a driver control unit 15 is further provided upon the installment of the information processing program previously described. The driver control unit 15 causes the installed printer driver to reflect (incorporate) the contents of a function data file that are stored in a printer setting area after the function data file is detected by the model data file detecting unit 12 outside or inside the driver package 10 and checked by the model data checking unit 13 for storage in the printer setting area. In the example shown in FIG. 2, the driver control unit 15 causes the installed printer driver to reflect (incorporate) the contents of the function data files DFa, DFb, and TFc based on the function data files DFa and DFb inside the driver package 10 and the function data file TFc outside the driver package 10 that are stored in the respective printer setting areas Pa, Pb, and Pc after detecting and checking.

The server SV is provided with a communication unit (network interface) to communicate with the client terminals CL1 through CLn via the network 2. In response to a request from the client terminals CL1 through CLn, the server SV transmits, to the client terminals CL1 through CLn via the communication unit, at least one of the additional function data files stored in the printer setting areas Pa through Pc or printer drivers (device drivers) relating to (incorporating) the added functions stored in the driver package 10.

The above description has been given with respect to a configuration in which the model data file detecting unit 12, the model data checking unit 13, and the model data management unit 14 are implemented in the driver package 10. These functional units 12 through 14 may alternatively be implemented outside the driver package 10. If these functional units 12 through 14 are implemented outside the driver package 10, the client terminals CL1 through CLn need to have similar functional units implemented therein in order to reflect the contents of the functional units in the client terminals CL1 through CLn.

In the following, the operation of the present embodiment will be described. The network system 1 of the present embodiment registers an additional model or additional function as an additional function data file in the server SV. Utilizing the standard functions of the operation system, the network system 1 can reflect (incorporate) the additional model or additional function in the printer drivers of the client terminals CL1 through CLn.

FIG. 1 and FIG. 2 illustrate the state in which the printer Prc of new model C is connected after the driver package 10 inclusive of drivers for model A and model B is installed, so that the additional function data file TFc is registered for the added model C. In FIG. 2, the model data file detecting unit 12 detects the functional data file DFa for model A and the functional data file DFb for model B inside the driver package 10. The model data checking unit 13 then determines that these data files belong to model A and model B as originally installed as printer drivers. These data files are thus stored and registered in the respective printer setting areas Pa and Pb.

Figure 3:
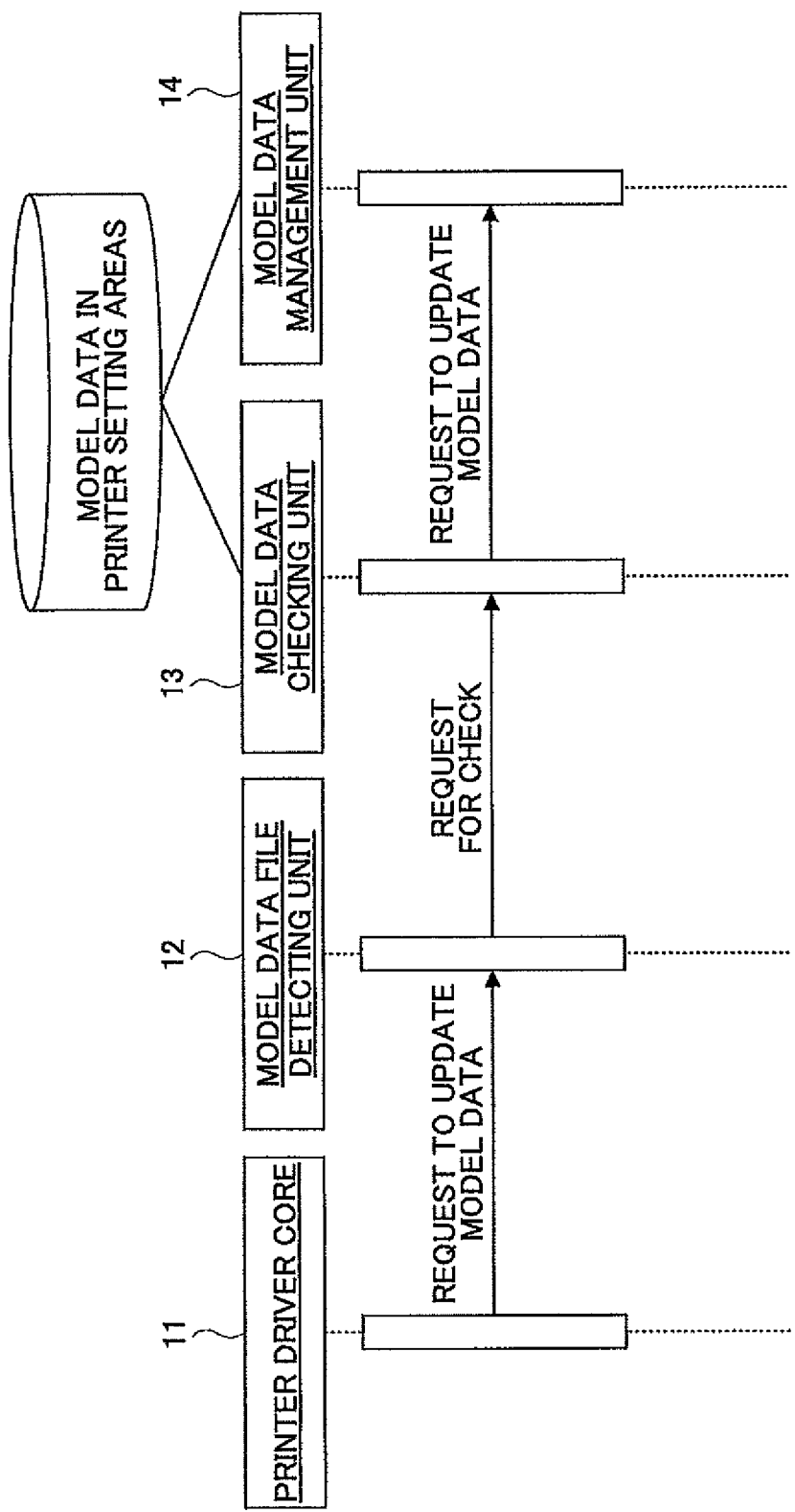
FIG. 3 is a sequence chart showing a process of updating a function in the server of FIG. 2.

In this state, the printer Prc of new model C is connected, and the additional function data file TFc for model C is installed. As shown in FIG. 3, upon a request to update model data from the user interface of the printer driver core 11, the model data file detecting unit 12 performs a search and detects the additional function data file TFc. The model data file detecting unit 12 then passes the detected additional function data file TFc to the model data checking unit 13, and requests checking. The model data checking unit 13 compares the additional function data file TFc, for which checking is requested, with printer management information contained in each printer setting area Pa and Pb, thereby determining which model relates to the additional function data file TFc. Upon finding that the additional function data file TFc belongs to model C that is newly connected, the model data checking unit 13 sends a request to update model data to the model data management unit 14.

The model data management unit 14 stores and registers the function data file for model C in the printer setting area Pc for model C as shown in FIG. 2.

Figure 4:
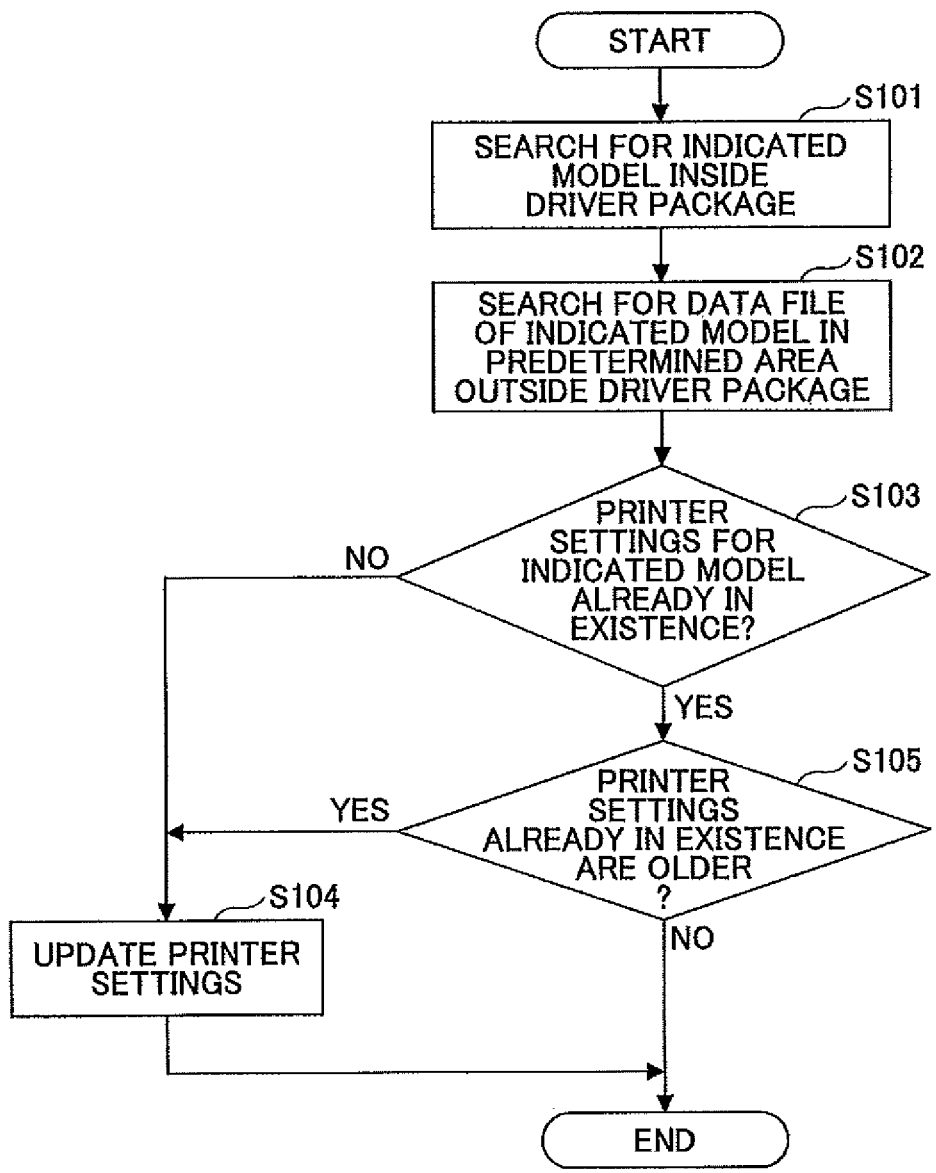
FIG. 4 is a flow chart showing the process of updating a function in the server of FIG. 2.

Namely, as shown in FIG. 4, the model data file detecting unit 12 of the server SV responds to a request for model data update from the printer driver core 11 by searching the indicated model in the driver package 10 (step S101). Then, the model data file detecting unit 12 attempts to find a function data file for the indicated model in a predetermined area outside the driver package 10 (step S102). Upon detecting a functional data file, the model data checking unit 13 checks whether a printer setting for the indicated model is in existence in any one of the printer setting areas, i.e., checks whether there is a printer setting area Pc (step S103). If there is no printer setting area for the indicated model, the model data management unit 14 sets up (registers) a printer setting area containing the additional function data file (step S104). With this, the procedure comes to an end. If it is found in step S103 that the printer setting area is already in existence, information contained in such printer setting area is compared with the contents of the additional function data file (step S105). If the existing information contained in the printer setting area is older, the contents of the printer setting area are replaced (updated) by the contents of the additional function data file (step S104). With this, the procedure comes to an end. If the model data checking unit 13 ascertains in step S105 that the existing information in the printer setting area is the same as or newer than the information contained in the additional function data file, the model data management unit 14 refrains from updating the printer setting area. Without update, the procedure comes to an end.

Information in the driver package 10 and printer setting areas is under the management of the operating system. The data file for model C, however, is not recognized as the driver package 10 by the operating system because this data file is placed outside the driver package 10.

In the network system 1, the Windows operating system uses Point&Print to install the printers Pra, Prb, and Prc managed by the server SV to the client terminals CL1 through CLn in response to a request from the client terminals CL1 through CLn. There may be a case in which the printers Pra and Prb are installed first, and, then, the additional function data file for the printer Prc of model C is registered in the server SV to cause the printer setting area Pc to be registered. In such a case, the client terminals CL1 through CLn already have the driver package 10 and the model-A&B printer setting areas Pa and Pb registered therein, and, then, receive the printer setting area Pc for model C for registration therein as shown in FIG. 5.

As described above, the operating system recognizes the driver package 10 and the printer setting areas Pa, Pb, and Pc, but does not recognize the additional function data file TFc placed outside the driver package 10. Because of this, Point&Print transmits only the contents of the driver package 10 and the printer setting areas Pa, Pb, and Pc from the server SV to the client terminals CL1 through CLn. However, the additional function data file TFc for model C added to the server SV in FIG. 2 is not transmitted to the client terminals CL1 through CLn, as illustrated in FIG. 5.

Figure 5:
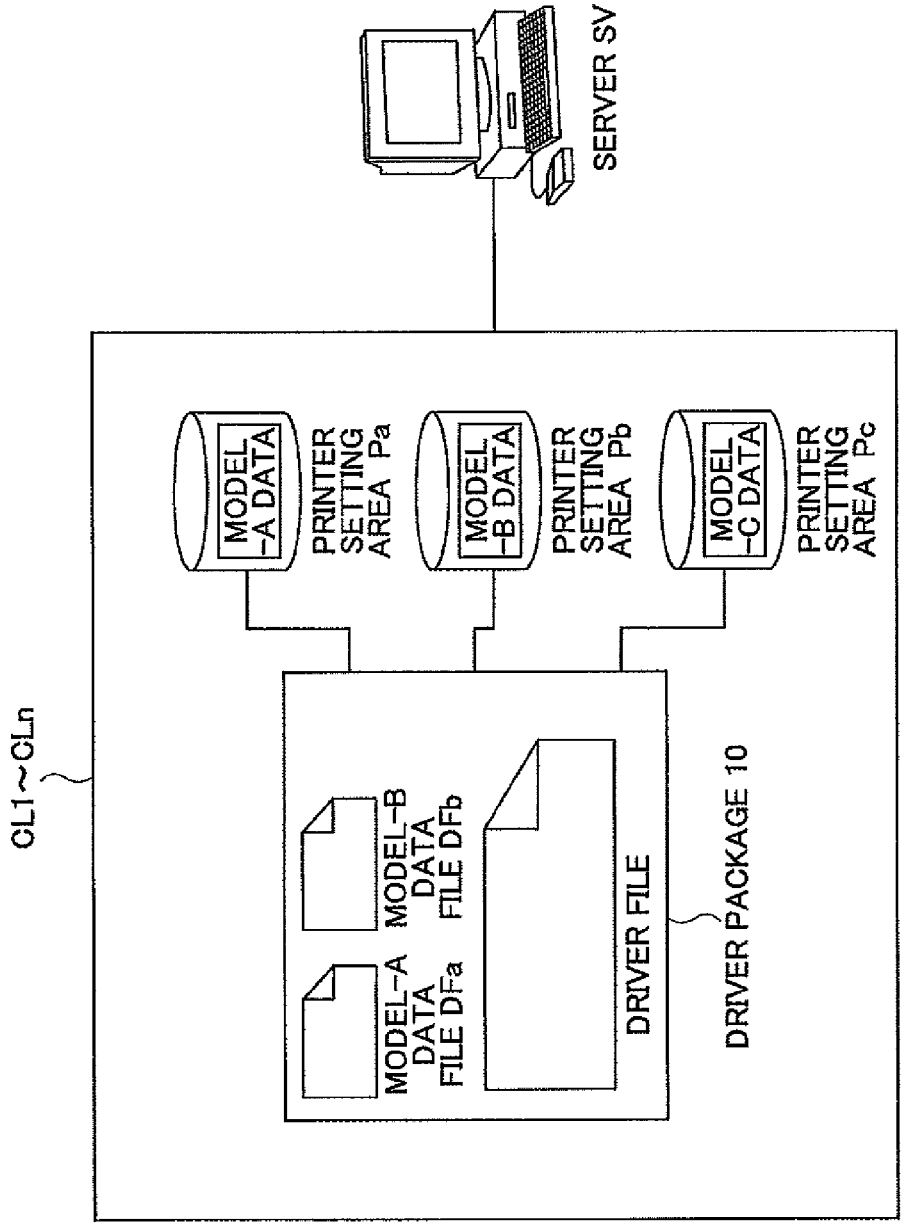
FIG. 5 is a block diagram showing main functional blocks of a client terminal in which an update as shown in FIG. 2 is incorporated.

It should be noted that the printer setting area Pc for model C is transmitted and registered in the client terminals CL1 through CLn as shown in FIG. 5. Because the client terminals CL1 through CLn operate by reading information from the printer setting area Pc for model C, the client terminals CL1 through CLn can operate according to the contents of the additional function data file TFc that is added in the server SV.

In this manner, the operation of the printer driver using the additional function data file TFc and the Point&Print function both achieve their respective objectives as intended. To be more specific, the printer driver does not define its operation by directly utilizing the additional function data file TFc that exists outside the areas recognized as printers by the operating system. The printer driver defines its operation by indirectly utilizing the information corresponding to the additional function data file TFc that is set in the printer setting areas Pa, Pb, and Pc recognized as printers by the operating system. The functions of the operating system guarantees proper handling of information contained in the printer setting areas Pa, Pb, and Pc that are recognized as printers by the operating system. Benefit of the functions supported by the operating system can thus be utilized.

Figure 6:
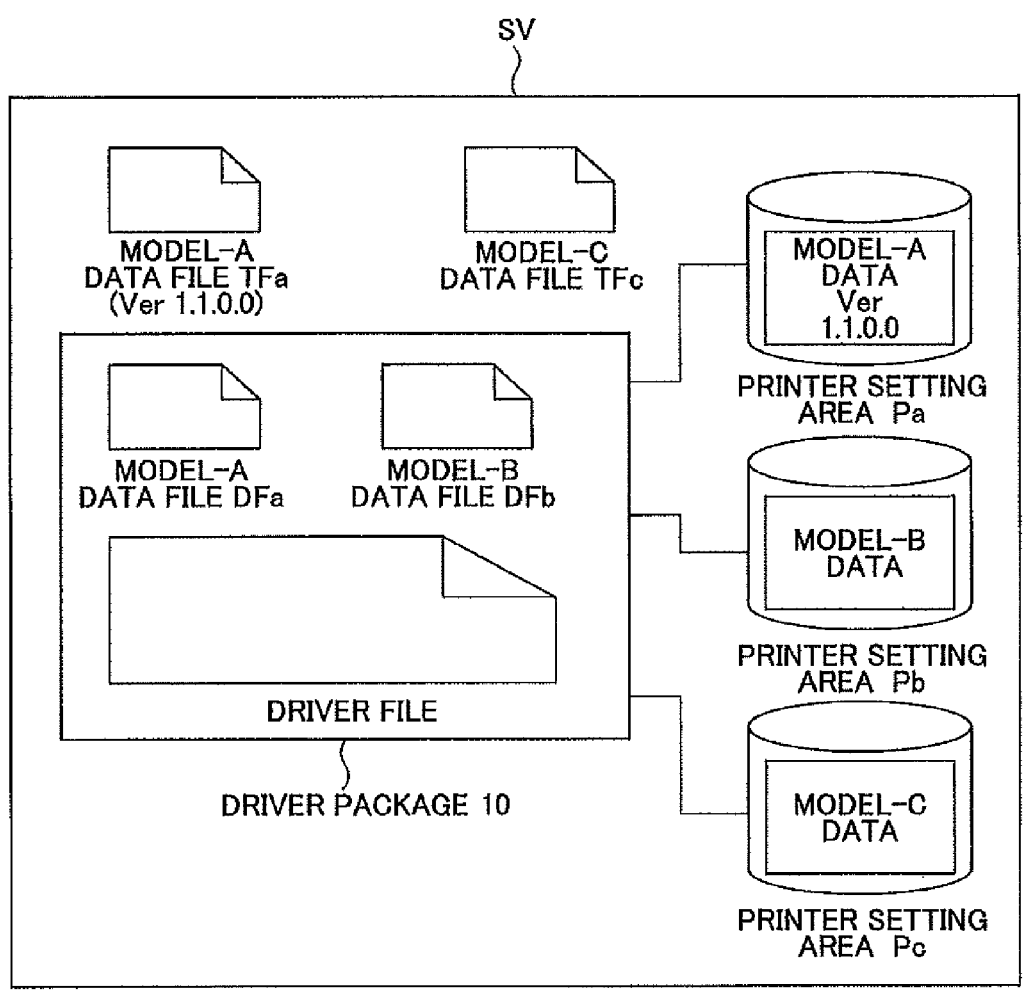
FIG. 6 is a block diagram showing main functional blocks of the server shown in FIG. 2 in which a function data file for version-up is registered.
Figure 7:
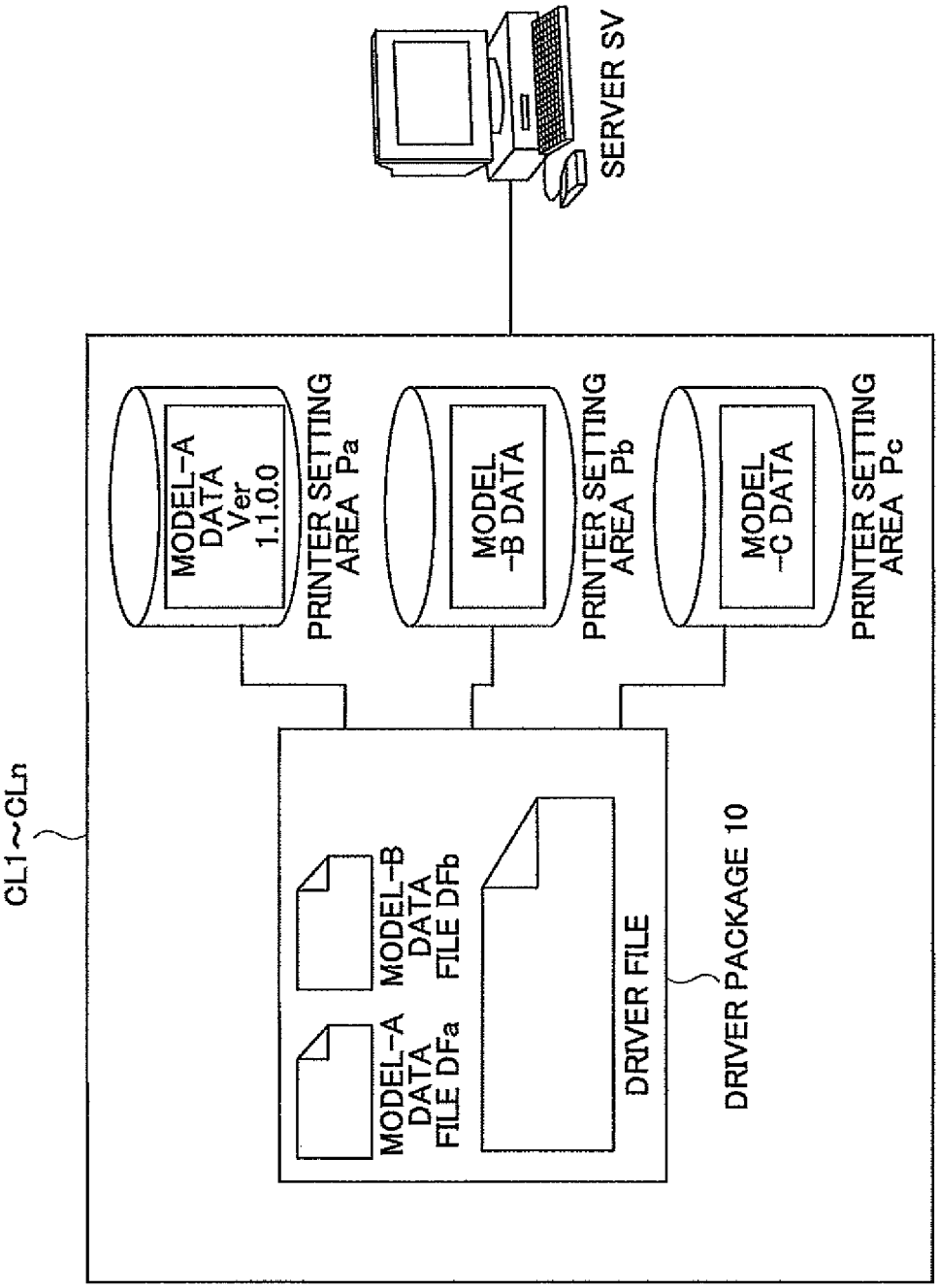
FIG. 7 is a block diagram showing main functional blocks of the client terminal in which an update as shown in FIG. 6 is incorporated.

The process of updating printer driver information using Point&Print that is a standard driver management function of the operating system makes it possible for the client terminals CL1 through CLn to utilize the driver information registered in the server SV. Such updating process is not only used to install a new model but also used to perform a version update with respect to a function data file of each model as shown in FIG. 6 and FIG. 7. As shown in FIG. 6, an additional function data file TFa (Version 1.1.0.0) for model A is already registered in the server SV, having updated the old version (Version 1.0.0.0). In response to a request for model data update from the user interface of the printer driver core 11, the model data file detecting unit 12 performs a search and detects the additional function data file TFa. The model data file detecting unit 12 then passes the detected additional function data file TFa to the model data checking unit 13, and requests checking. The model data checking unit 13 compares the additional function data file TFa, for which checking is requested, with printer management information contained in each printer setting area Pa, Pb, and Pc, thereby determining which model relates to the additional function data file TFa. Upon finding that the additional function data file TFa is a version-up file for existing model A, the model data checking unit 13 sends a request to update model data to the model data management unit 14. Here, the version-up file is a file directed to an updated version of an existing model.

The model data management unit 14 updates the function data file contained in the printer setting area Pa for model A by replacing it with the additional function data file TFa for version-up, as shown in FIG. 6.

In the case of updating a function data file as shown in FIG. 6, the additional function data file TFa for model A placed outside the driver package 10 is not transmitted to the client terminals CL1 through CLn, as illustrated in FIG. 7. Although the additional function data file TFa is not registered outside the driver package 10 in the client terminals CL1 through CLn, information contained in the printer setting area Pa for model A is not concerning the old version, but is already updated to the contents of the additional function data file TFa provided as a version-up.

When updating the function data file, the server SV may store a function data file itself, or may store data made by converting the function data file into a format that is more suitable for use by the printer driver.

In this manner, the information processing apparatus of the present embodiment uses the model data file detecting unit 12 to detect an additional function data file including a description of an added function that is provided in addition to the already-installed device driver. The model data management unit 14 stores the detected additional function data file in a printer setting area that is a predetermined information storage area recognized as logical devices by the operating system. With this arrangement, the already-installed printer driver can reflect (incorporate) the contents of the additional function data file based on the additional function data file stored in the printer setting area. Accordingly, it is possible to effectively and properly add a function for an additional model or function update to the printer driver without modifying the contents of the driver package 10 while utilizing all the benefit of the functions of the operating system.

In the information processing apparatus of the present embodiment, information about already-installed printer drivers is stored in advance in the printer setting areas. The model data checking unit 13 compares information contained in the additional function data file with the existing information contained in the printer setting areas. The model data management unit 14 controls the storing of the additional function data file in a printer setting area based on the results of the comparison. This prevents an old-version additional function data file from replacing the information in the printer setting area, thereby making it sure to always update the information in the printer setting area with the newest additional function data file.

The information processing apparatus of the present embodiment is provided with a communication unit (network interface) to communicate with the client terminals CL1 through CLn via the network 2. In response to a request from the client terminals CL1 through CLn, the information processing apparatus transmits to the client terminals CL1 through CLn at least one of the additional function data file stored in the printer setting area and the printer driver relating to (incorporating) the additional function data file. This makes it possible for the client terminals CL1 through CLn to properly reflect the added function based on the additional function data file registered in the server SV.

The server SV of the present embodiment has printer setting areas that are associated with the already-installed printer drivers. Accordingly, it is possible to properly determine which additional function data file belongs to which printer setting area, thereby properly registering and updating the additional function data file.

Figure 8:
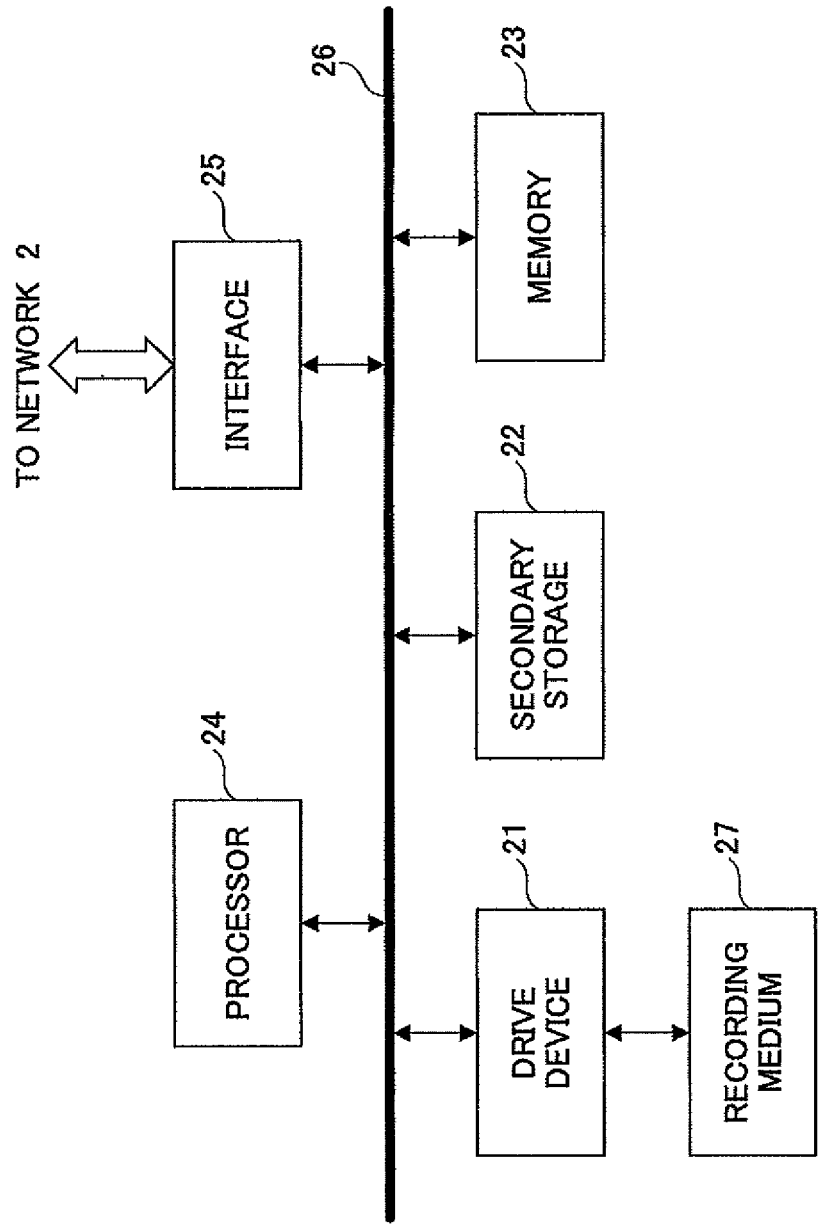
FIG. 8 is a block diagram showing an example of the configuration of an apparatus used as the server.

FIG. 8 is a block diagram showing an example of the configuration of an apparatus used as the server of the above-described embodiment. As shown in FIG. 8, an apparatus used as the server is implemented as a computer such as a personal computer, an engineering workstation, or the like. The apparatus of FIG. 8 includes a driver device 21, a secondary storage 22 such as a hard disk, a memory 23, a processor 24, an interface 25, a bus 26, and a recording medium 27.

The driver device 21 drives a recording medium 27 such as a CD (Compact Disc), a CD-RW (Compact Disc Rewritable), a DVD (Digital Versatile Disk), or the like. The recording medium 27 is an exchangeable medium that can be inserted into and extracted from the driver device 21. The interface 25 provides for communication to be conducted via the network shown in FIG. 2 with client terminals, printers, and any other remote apparatus.

The method of adding a function to the printer driver according to the present invention is provided as a computer program executable by the computer shown in FIG. 8. This computer program is stored in the recording medium 27 that is mountable to the driver device 21. The computer program is loaded to the memory 23 or to the secondary storage 22 from the recording medium 27 through the driver device 21. Alternatively, the computer program may be stored in a remote memory medium (not shown), and is loaded to the memory 23 or to the secondary storage 22 from the remote memory medium through the network 2 and the interface 25.

Upon an instruction for program execution, the processor 24 loads the program to the memory 23 from the recording medium 27, the remote memory medium, or the secondary storage 22. The processor 24 executes the program loaded to the memory 23 by use of an available memory space of the memory 23 as a work area. The memory 23 stores therein control programs for the purpose of controlling basic operations of the processor 24.

The execution of the computer program as described above serves to add a function to the already-installed printer driver as described in the above embodiment. The computer shown in FIG. 8 may also be used as a client terminal shown in FIG. 2 to update the printer driver as described in the above embodiment.

Further, the present invention is not limited to these embodiments, but various variations and modifications may be made without departing from the scope of the present invention.

The present application is based on Japanese priority application No. 2007-185341 filed on Jul. 17, 2007, with the Japanese Patent Office, the entire contents of which are hereby incorporated by reference.

What is claimed is:

1. An information processing apparatus, comprising:
an operating system for managing a device;
a processor for executing a program;
a detecting unit configured to, detect an additional function data file located outside of a driver package, wherein the operating system does not recognize the additional function data file, wherein said additional function data file including a description of an added function that is provided in addition to a device driver which has been already installed in the information processing apparatus by searching outside of the driver package for the device driver within the information processing apparatus;
a checking unit configured to receive, from the detecting unit, the detected additional function data file and comparing the detected additional function data file and model information which is already stored in a print setting area of a predetermined information storage area and to identify a device corresponding to the detected additional function data file; and
a storing unit configured to, store the detected additional function data file in the predetermined information storage area located outside of the driver package and inside the information processing apparatus, wherein the storing includes converts the function data file into a format suitable for the driver package and the detected additional function data file is recognized as a logical device by the operating system so as to maintain contents of the driver package without changes and wherein the operating system is configured to send the detected additional function data file stored in the predetermined information storage area and the driver package to an external apparatus connected to the information processing apparatus via a network in response to a request from the external apparatus so as to reflect the detected additional function data file in the driver package.

2. The information processing apparatus as claimed in claim 1, wherein the predetermined information storage area is provided to each of devices which are managed by the operating system, the information processing apparatus further comprises a checking unit configured to compare the detected additional function data file and information which is already stored in the predetermined information storage area and identify a device corresponding to the detected additional function data file, the storing unit is configured to store the detected additional function data file in the predetermined information storage area corresponding to the identified device.

3. The information processing apparatus as claimed in claim 1, wherein the predetermined information storage area is associated with the driver package of the device driver which has been already installed in the information processing apparatus.

4. The information processing apparatus as claimed in claim 1, wherein the driver package is configured to define its operation not by directly utilizing the additional function data file located outside an area which is recognized by the operating system, but by indirectly utilizing information corresponding to the additional function data file located in the predetermined information storage area which is recognized by the operating system.

5. A non-transitory machine-readable recording medium having a program embodied therein for causing a computer to execute a method to add a function to an already-installed device driver, said method comprising the steps of:

detecting an additional function data file located outside of a driver package, wherein the operating system does not recognize the additional function data file, wherein said additional function data file including a description of an added function that is provided in addition to a device driver which has been already installed in an information processing apparatus having an operating system for managing a device by searching outside of the driver package for the device driver within the information processing apparatus;

receiving, from the detecting unit, the detected additional function data file;

comparing the detected additional function data file with a model information which is already stored in a print setting area of a predetermined information storage area;

identifying a device corresponding to the detected additional function data file; and storing the detected additional function data file in a predetermined information storage area located outside of the driver package and inside the information processing apparatus, wherein the storing includes converting the function data file into a format suitable for the driver package, and the detected additional function data file is recognized as a logical device by the operating system so as to maintain contents of the driver package without changes and wherein the operating system is configured to send the detected additional function data file stored in the predetermined information storage area and the driver package to an external apparatus connected to the information processing apparatus via a network in response to a request from the external apparatus so as to reflect the detected additional function data file in the driver package.

6. The non-transitory machine-readable recording medium as claimed in claim 5, wherein the predetermined information storage area is provided to each of devices which are managed by the operating system, the information processing apparatus further comprises a checking unit configured to compare the detected additional function data file and information which is already stored in the predetermined information storage area and identify a device corresponding to the detected additional function data file, and the storing unit is configured to store the detected additional function data file in the predetermined information storage area corresponding to the identified device.

7. The non-transitory machine-readable recording medium as claimed in claim 5, wherein the predetermined information storage area is associated with the driver package of the device driver which has been already installed in the information processing apparatus.

8. A method of adding a function to an already-installed device driver, comprising the steps of:

detecting an additional function data file located outside of a driver package whereby the operating system does not recognize the additional function data file, said additional function data file including a description of an added function that is provided in addition to a device driver which has been already installed in an information processing apparatus having an operating system for managing a device by searching outside of driver package for the device driver within in the information processing apparatus;

receiving, from the detecting unit, the detected additional function data file;

comparing the detected additional function data file with a model information which is already stored in a print setting area of a predetermined information storage area;

identifying a device corresponding to the detected additional function data file; and storing the detected additional function data file in a predetermined information storage area located outside of the driver package and inside the information processing apparatus, wherein the storing includes converts the function data file into a format suitable for the driver package and the detected additional function data file is recognized as a logical device by the operating system so as to maintain contents of the driver package without changes and wherein the operating system is configured to send the detected additional function data file stored in the predetermined information storage area and the driver package to an external apparatus connected to the information processing apparatus via a network in response to a request from the external apparatus so as to reflect the detected additional function data file in the driver package.

* * * * *